Patented Mar. 24, 1936

2,035,126

UNITED STATES PATENT OFFICE 2,035,126

RENDERING PROCESS

John P. Harris, Wilmette, Ill., assignor to Industrial Chemical Sales Company, Inc., New York, N. Y., a corporation of New York No Drawing. Application August 8, 1932, Serial No. 627,985

13 Claims. (Cl. 87—13)

This invention relates to an improved method of rendering fats. It has for its principal object the provision of a process by means of which animal fats of various characters may be converted in an economical manner into a good grade of lard, free from objectionable odor, of good color and taste and of a better stability and keeping quality. It also involves the provision of improved products resulting from the new method. By the improved process considerable economy is effected due to the elimination of various steps normally required in the purification of the product resulting from rendering operations. While my process is particularly applicable to the rendering of lard it is capable of general application to the rendering of various edible and inedible fats.

Various methods have been followed heretofore in the rendering of lard. In one type of process, known as wet rendering, the raw fats are charged into a closed vessel of suitable construction capable of withstanding the pressure used in the process. Steam under pressure, of say forty pounds, is introduced into the vessel and the fats are accordingly subjected to heat treatment at a suitable temperature in the presence of the steam thus introduced. Cooking is continued until the fats are thoroughly rendered from the tissue. When rendering is completed the contents of the tank are allowed to settle, the fat rising to the top and the water condensed from the steam and that removed from the fat settling to the bottom together with the tissue. The lard produced in this way has a high free fatty acid content, has a color (made up of reds, yellows, greens and blues) and is otherwise objectionable so that special purification treatment is required. This adds substantially to the cost of the final product and increases the time, labor and expense required in its production.

Another process commonly employed is known as dry rendering. In this process the fats are placed in a steam jacketed, closed vessel. It is similar to the wet rendering process except for the fact that the steam from outside sources is not brought into direct contact with the fats. Merely the heat of this steam is utilized and it in turn generates steam within the vessel from the water content of the fats. The dry process as now commonly practiced is subject to the same objections as the wet process. A third method sometimes followed is known as open kettle rendering. In this process the fats are heated in an open, steam-jacketed vessel and hence no pressure is built up. In other respects it is similar to the dry rendering process. It is slower than the closed vessel processes and is objectionable for the reason that oxidation of the fats leading to rancidity is permitted to take place too freely.

The present invention contemplates the addition of a suitable quantity of a form of activated carbon to the fats prior to or in the course of rendering the same. This may be added to the stock in any of the prior processes although it is more effective in connection with the closed vessel operations, either wet or dry. I have found that by adding a comparatively small amount of activated carbon to the fats to be rendered the color, odor and taste of the resulting product are greatly improved. Furthermore, the quantity of free fatty acids produced is diminished to a considerable extent. This not only effects a saving in the time and expense involved in eliminating these free fatty acids as far as possible but also offsets the loss in the useful fats which normally results from the formation of free fatty acids. These free fatty acids are produced as the result of decomposition of the fat into glycerine and the free fatty acids. Such decomposition is normally greatly hastened by the high temperature and pressure employed in the rendering process and as the result of hydrolysis due to the presence of water. A high free fatty acid content is undesirable in the final product due, among other things, to its tendency to produce bad color, an objectionable flavor and a lower smoke point in the rendered lard. Decomposition of the fat into the objectionable free acids is effectively prevented or reduced to a minimum by the appropriate use of an activated carbon in the rendering process.

Oxidation is another enemy to the production of a high quality lard. While oxidation of the lard to the extent of even as high as several per cent by volume may not be seriously objectionable since it may not impart a noticeably bad odor or taste, oxidation beyond that point does become objectionable due to the rancidity imparted to the lard. At ordinary temperatures oxidation takes place rather slowly but at the high temperatures produced in the rendering kettle, it is much more rapid. In closed kettle rendering the oxidation is held down to a large extent by the exclusion of air. However, lard rendered by these processes as now commonly practiced requires so much additional treatment for purification, etc., at elevated temperatures and when exposed to the air that the final product is oxidized to an objectionable degree. The result is that during or after the marketing of the lard it reaches the point of rancidity in a comparatively short time. According to the present process oxidation is substantially prevented in the course of rendering and the subsequent treatments of the rendered product are reduced to such an extent that the resulting oxidation in the purification stages is held to a minimum. This then permits a greater degree of oxidation in the course of marketing and in the use of the lard before rancidity is developed, with the result that the lard remains sweet for a longer period of time.

A purification step commonly employed and which may be eliminated in my process is the treatment of the rendered lard with fuller's earth. This treatment is usually conducted at a temperature around 200° F. at which oxidation is quite rapid and the fuller's earth apparently acts as a catalyst to induce oxidation. When activated carbon is added to the fats in the rendering kettle the fuller's earth treatment may be dispensed with.

The activated carbon apparently produces its desirable effect largely by a process of adsorption although some other property of a catalytic nature may also come into play. Oxygen which may be present in the charge and in the kettle at the beginning of the rendering operation is rapidly adsorbed by the carbon. Other substances within the fat or the kettle may also be adsorbed to the advantage of the final product. For example, various discoloring matters of a protein or other nature may be adsorbed. In the rendering of "sweet pickle" fats, i. e., trimmings from cured meats, the curing ingredients which are found so objectionable in the ordinary rendering processes are eliminated, probably by adsorption when the activated carbon is added to the stock prior to or in the course of rendering. Inasmuch as a comparatively small amount of activated carbon is sufficient to produce the desired result upon a large batch of fat it is possible that some type of catalysis is brought about by the carbon.

In order to further eliminate or reduce the oxidation of the lard, I preferably subject the same to vacuum in the treatments following the rendering operation. For example, I permit the material to settle and cool under the action of a vacuum so that oxygen is thus additionally excluded. Oxidation is, therefore, substantially prevented not only in the course of rendering but throughout the cooling of the lard down to a point where it becomes much less subject to oxidation.

Furthermore, I have discovered that my process improves the keeping qualities of the lard by leaving it in a state in which it naturally resists the building up of oxidation products. In the ordinary course of treating rendered lard by the use of fuller's earth or similar decolorizing and clarifying agents the resistance to oxidation is lowered so that oxidation products will build up within the treated lard more rapidly after purification than before. This, however, is not the case when the present process is employed since the activated carbon apparently has no deteriorating effect upon this resistance quality of the product and the subsequent treatment with fuller's earth or the like may be eliminated. Therefore, the improved product will not only stand for a greater degree of oxidation, in the course of marketing and use, before rancidity is developed but oxidation takes place more slowly than in the usual product. Both of these factors improve its keeping qualities.

The improved process consists in adding to the mixture of fats to be cooked a small quantity of activated carbon which may vary between, say, .05 and 1% more or less depending upon the nature of the stock being rendered and the activity of the carbon used as well as upon the quality of the product desired. I have found that activated carbon that is particularly effective may be produced in accordance with the processes set forth in the following patents: Statham, No. 1,146,363, granted July 13th, 1915; McKee, No. 1,133,049, granted March 23rd, 1915; Wickenden et al., No. 1,634,478, granted July 5th, 1927; and Okell et al., No. 1,686,100, granted October 2nd, 1928. If desired a certain amount of an alkali or a salt of such metals as sodium, potassium, and calcium may be added at the same time as the activated carbon. For example, a mixture of, said, 40% of sodium bicarbonate and 60% of activated carbon may be added to the fats. The alkali will assist in removing the free fatty acids although it has been found that it is in no way essential to the successful use of the activated carbon. It may be mentioned that the use of an alkali without the carbon is not satisfactory inasmuch as the reaction between the free fatty acids and the alkali will tend to produce soap and thus impart a bad taste. The alkali, if added alone, would also produce excessive frothing in the rendering kettle and thus interfere with the process. When activated carbon is also present, on the other hand, the frothing is prevented and any soap that may be formed is apparently adsorbed by the carbon.

At the same time the bicarbonate or similar alkali assists in settling out the activated carbon upon completion of the heat treatment. It may be, therefore, of some value in speeding up the process as a whole in addition to its possible neutralization of the free fatty acids.

While the present process is particularly advantageous in the rendering of edible fats, it is also of value in connection with inedible fats and the rendering of all fats from cattle, sheep and various other animals. In the rendering of inedible fats it may be desirable to use a quantity of activated carbon equal to 2 or 3% of the weight of the charge being rendered.

The conduct of the process may be more clearly understood from certain specific examples of operations which have been successfully carried out.

A typical wet rendering operation may be conducted in the following manner. The raw fats are charged into a closed tank constructed preferably of steel, cylindrical in shape and having a dished removable top head and a deep conical bottom. This tank is of suitable capacity, adapted to receive, say, 2,500 pounds of fat or in a larger scale apparatus it may receive a 10,000 pounds charge. It should be capable of withstanding an internal working pressure of from eighty to one hundred pounds per square inch. A small charge of bones and water may first be introduced into the tank through the open top. Live steam may be introduced through an opening at the center of the conical bottom and the fat to be rendered may then be charged into the tank. The activated carbon is then added either in a dry powdered state or as a suspension in a small amount of water, with or without an alkali or salt of the character mentioned. If it is added in a dry state it is best to wet it down with water from a hose or the like. The amount of carbon introduced will depend upon various factors such as its degree of activity in relation to the process, the type of fats being treated, and the quality of the product which it is sought to produce. It will be found that excellent results will be had from the use of .05% to .5% of an active carbon such as hereinbefore described in the rendering of almost any types of fats.

After the tank has been properly charged it is headed up by placing a cover over the opening at the top. The steam valve at the bottom of the tank is then opened wide and steam is admitted into direct contact with the contents until a desired pressure is built up. Due to the presence of the activated carbon, it is possible to employ higher pressures in the tank than heretofore. Activated carbon, for example, tends to stabilize the fats and prevents decomposition even under high pressures and temperatures. A pressure of 60 pounds may very readily be maintained and higher pressures may be used to advantage if the tank is capable of withstanding them. It will be understood that steam will be admitted throughout the rendering operation and that venting of steam to purge the tank will likewise take place throughout the time of rendering. For this purpose a pet-cock in the top head may be opened up, continuously or from time to time during rendering, so that steam and vapors will be blown out from the top of the kettle above the agitated mixture of lard, water and tissue. This venting of the steam tends to purge the tank of undesirable vapors, such as carbon monoxide and those low boiling fatty acids or isomers and those vapors containing the bad odors of fats which may be in a state of incipient decomposition. Cooking of the fats should be continued until the fat has been thoroughly rendered from the tissue. The time required for this purpose will depend upon various factors, such as the nature and quality of the original charge, the steam pressure maintained, etc. If 10,000 pounds of leaf fats are being rendered in a standard tank at a pressure of 60 pounds, the rendering should be complete within an hour and a half. If cutting fats (carcass fats) are treated under the same conditions, the time required for thorough rendering will be about three hours. Should a steam pressure of 40 pounds instead of 60 pounds be employed, the time element would again be substantially doubled. It will be clear, therefore, that the ability to run the pressures up in my process brings about a substantial economy in time.

When the rendering operation is completed the steam is cut off and residual steam within the tank is slowly released through a suitable vent. The contents of the tank are then allowed to settle, the water released from the fat together with the water condensed from the steam settling to the bottom together with the tissue and most of the activated carbon. The fats rise to the top and may be decanted off after settling is completed. Either during or immediately after the settling operation the tank contents is preferably subjected to a partial vacuum. This has various beneficial effects. In the first place it tends to remove the oxygen which may otherwise be present in the air within the tank. At the high temperatures at which the stock will be maintained during settling, any available oxygen will be rapidly taken up by the fats with resultant deterioration of the product. Furthermore, the production of a partial vacuum within the tank will tend to reduce its temperature by virtue of the increased vaporization which will ensue and the adsorption of the latent heat of vaporization. This insures reduction of the temperature of the fat to a less dangerous point for the filtering operation during which it will be placed in contact with the air. At low temperatures, say, below 140° F., the oxidation of the lard takes place quite slowly while at higher temperatures it is much more rapid. It is, therefore, desirable to maintain the temperature as low as possible during filtration consistent with an economical speed of filtration. Obviously, it should not be cooled too far or its consistency will be increased to the point where it will be extremely difficult to filter.

After the fats have been permitted to settle and cool sufficiently the lard is decanted and discharged from the tank into a receiving vessel through one or more cocks suitably located in the wall of the tank. From the receiving vessel the rendered lard may be pumped through a filter press which may, for example, be lined with diatomaceous earth, back of filter cloth and possibly filter paper to insure complete removal of any impurities, moisture and suspended carbon, leaving a clear, white, brilliant and odorless product. This filtration is not vital to my process because settling alone leaves the product clear and pure. It may be desirable to add some agent to the stock being rendered to assist in the complete settling of the carbon. For this purpose any of the alkalis or salts previously mentioned may be used.

The tankage and tank water or residue within the tank after decanting the lard will contain the major portion of the activated carbon and will, as the result of the action of the carbon, be considerably sweetened in odor. Ordinarily the tank water if allowed to stand and cool for a few hours will become sour and rank. The tank water resulting from the present process, however, has been found to retain a comparatively sweet odor over a period of several days during which it has been kept at ordinary temperatures providing a sufficiently high percentage of activated carbon has been used. This is a distinct advantage since it eliminates a large part of the most disagreeable odors incident to the rendering of lard. While the carbon will tend to darken the color of the tankage somewhat the presence of the carbon will in fact enhance the keeping quality of the tankage and improve it for the manufacture of animal feed and similar products.

Very much the same procedure may be followed in a dry rendering operation. In this case the raw fat will normally be charged into a horizontally disposed, mechanically agitated, steam-jacketed tank. Steam will be forced into the jacket at the start. After the fat has been introduced the activated carbon may be added either in suspension in water or in a dry state. If added dry it should preferably be wet-down with a hose as before. The closure for the charging opening at the top of the tank should then be closed and the steam directed into the jacket will then heat the fat and drive the moisture from it. This moisture will be converted into steam and will create a pressure which may advantageously be carried as high as 20 to 40 pounds. A relief valve is provided, to prevent building up a pressure above a predetermined limit and to remove moisture as this is essentially a drying operation. The steam in the jacket may be under 40 to 80 pounds pressure. In order to avoid burning of any of the fats and to obtain uniform heating the material in the tank is preferably agitated by suitable mechanical means. The danger of burning the fat and of hydrolysis, even at the high temperature employed in this process, is eliminated by the action of the activated carbon. The cooking is completed when practically all of the moisture has been driven from the fats which are being rendered and when the moisture in the tissue or cracklings has been driven off. The cracklings, after rendering, should be reduced to below 10% moisture. Samples may be taken from the batch and tested to determine when the rendering is complete.

After the rendering is completed the pressure is released and the tank subjected to vacuum, if desired, to effect cooling. The material may then be strained by dumping it into a vessel having a perforated bottom. The tissue which remains in this vessel may be subjected to pressure in an expeller or hydraulic curb press to remove the residual lard which does not flow freely through the perforations. The lard may be filtered or merely settled as in the wet rendering process to produce a clear, brilliant, odorless product.

It has been found that the percentage of cracklings produced in the rendering process is reduced by the use of activated carbon. This is apparently due to a more thorough separation of the lard from the tissue during a given cooking operation so that the yield of lard is somewhat higher. Probably this is brought about by the adsorption of the gelatinous matter of the cracklings by the activated carbon.

Open kettle rendering may be conducted in substantially the same way as the dry rendering except that no pressure or vacuum may be established upon the lard during the rendering operation. Steam is directed into a jacket surrounding the open kettle in the same manner as in the dry rendering process and the charge is preferably agitated.

In one instance a dry rendering process was carried out as follows: ten pounds of activated carbon was added to twelve gallons of water and thoroughly mixed. This was added to approximately 2,430 pounds of fat, consisting of the following mixture:

| | Pounds |
|---|---|
| Beef gut fat | 130 |
| Head fat | 130 |
| #2 Back fat | 410 |
| #1 Soft fat | 210 |
| #1 Back fat | 260 |
| #1 Back and soft fat | 240 |
| Leaf fat | 365 |
| #2 Soft fat | 600 |
| Pig tail | 85 |
| Total | 2,430 |

The resulting product had a color, as tested by the standard Lovibond color glasses in accordance with the official method of the American Oil Chemists Society, of 4.0 yellow and 0.4 red and a free fatty acid content of .16%. There was a very desirable absence of taste and odor in the rendered lard. These results were a great improvement over those obtained from similar runs in which no activated carbon was employed.

As an instance of a wet rendering operation the following is cited: 2,346 pounds of killing fats were introduced into a wet rendering kettle. 5.4 pounds of activated carbon was added and the steam turned into the kettle. Cooking of the fat was continued for a period of two hours and fifteen minutes. The resulting product after settling for the usual period had a clear and brilliant color and contained .13% of free fatty acids. The color of the lard was 2.0 yellow and 0.1 red which is considerably better than is usually obtained from the rendering of fresh fats. The free fatty acid content was also about 50% less than is usually present when no activated carbon is used in the course of rendering. Here also there was a complete absence of objectionable taste and odor in the rendered lard.

In another run sweet pickle fats, which are very difficult to render and convert into a salable lard, were treated by the improved process. 2,500 pounds of these fats were placed in a wet rendering kettle and seven pounds of activated carbon was added. The steam treatment was continued for the usual period and the contents of the kettle then permitted to settle. The free fatty acid content of the resulting lard was 1.1% and the color was 18.0 yellow and 1.2 red. It had a flavor approximating that of regular prime steam lard. This is quite remarkable inasmuch as the same types of fat when rendered in the ordinary way in the same plant on the same day yielded a lard of extremely bad color, 45.0 yellow and 8.0 red, and a free fatty acid content of 2.6%. This difficulty in rendering sweet pickle fats may be explained by the fact that they are usually more than ninety days old before they are available for rendering due to the time required in the curing of the meat. Furthermore, a high color is imparted to the fat by the curing ingredients, such as sugar, salt, salt-petre and potassium or sodium nitrite. The addition of the activated carbon to the fats prior to rendering appears to bring about adsorption of these curing ingredients along with other coloring matter and the like. Lard rendered from sweet pickle fats according to my process is of good grade and is marketable directly as produced. Heretofore it has been necessary to dispose of lard produced from sweet pickle fats by introducing limited quantities into the higher grade products thus reducing their quality to a certain extent.

It will thus be seen that my process involves a distinct improvement over prior rendering processes in that it enables the complete elimination of the decolorizing or purifying treatment with fuller's earth normally required. This, as pointed out, eliminates the major portion (substantially more than 50%) of the oxidation normally incident to the production of lard and thus results in a better grade product. If the improved method is followed out carefully, practically all oxidation during processing may be eliminated. The development of free fatty acids in the rendering process is greatly retarded with the result that the product is further improved and the loss of desirable fats due to decomposition is reduced to a minimum. The reduction in the free fatty acids is estimated as a minimum of 30% and in most instances it will be as much as 50% or more. In lieu of simply removing objectionable ingredients by subsequent purification of the lard, my process actually prevents or, at least, retards their formation. A very marked improvement in the odor and taste of the final product is obtained. Lard has heretofore been found objectionable by many cooks and bakers on account of its usual tendency to create a bad odor in the kitchen and to impart a somewhat disagreeable odor and taste to the cooked or baked product. Lards heretofore produced have quite generally had a certain "meaty" odor and flavor which is due apparently to the presence of the tissue during the rendering operation and its action upon the fat from which it is being rendered. Many persons engaged in cooking or baking have consequently displayed a preference for a good grade of vegetable shortening which will not impart an objectionable taste or odor to the product. The present process enables the production of a lard, in an inexpensive way, which is equally as free from objectionable odor and taste as the better grades of vegetable shortening and will not smell up the kitchen in the course of cooking. The tendency of the tissue to impart a "meaty" odor and flavor to the fat is apparently offset or eliminated by the presence of the activated carbon during rendering. Possibly one reason for the improved odor of the lard produced by this process is the fact that higher temperatures, in the neighborhood of 300° F., corresponding with higher pressures, are permitted in the course of rendering and simultaneous purification. Under ordinary methods of dry rendering the gluey, mucilaginous and gelatinous material coming particularly from pig skins, hides, feet, snouts, bones, etc., have a tendency to emulsify with the lard toward the end of the operation. This results in an objectionable darkening of the product. The activated carbon added in my process serves to eliminate or greatly reduce this emulsification, probably by absorption of the gelatinous matter, and thus greatly improves the product. Furthermore, by permitting higher temperatures and pressures to be utilized, the improved process may be speeded up to a marked degree with resulting economy. Other advantages of the new process have been pointed out in the detailed description of the same. Still others will become apparent in the practice of the invention.

While I have discovered that activated carbon made in accordance with the processes mentioned is especially effective for the purposes described other forms of activated carbon will also afford similar benefits when used in the manner explained. The quantities of activated carbon required or desirable under particular circumstances will vary with the degree of activation. While certain specific proportions and operating conditions have been mentioned it will be understood that these are given by way of illustration only and that the process in accordance with the present invention may be varied considerably within the scope of the appended claims. Pressures between 40 and 60 pounds within the rendering kettle are preferable although this may readily be exceeded if the kettle will permit it. A pressure below 40 pounds is also permissible but it is not as efficient as the higher pressure. It will normally be found preferable, when an alkali is added with the carbon, to use somewhat less alkali, by weight, than carbon although in some instances an excess of the alkali will be satisfactory. While the carbon is preferably added at the beginning of the rendering operation it may, if desired, be added after rendering has been partially completed.

What I claim is:

1. A method of rendering animal fats from tissues which comprises adding activated carbon capable of adsorbing substantial quantities of gas and the like to a charge of fats to be rendered, the carbon added being between .05 and 1.0% of the charge by weight, and maintaining the charge in a closed vessel at a rendering temperature in the presence of the carbon for a period of more than 30 minutes.

2. A method of rendering animal fats from tissues which comprises adding highly activated carbon to a charge of fats to be rendered, the carbon added being between .05 and 1.0% of the charge by weight, and maintaining the charge in a closed vessel at a rendering temperature and under a pressure of more than forty pounds in the presence of the carbon for a period of more than 30 minutes.

3. A method of rendering animal fats from tissues which comprises adding a mild alkali and activated carbon to a charge of fats to be rendered and maintaining said charge at a rendering temperature out of direct contact with the atmosphere and in the presence of said activated carbon and said alkali for a sufficient time to separate the fat from the tissue, said alkali being added in sufficient quantity to substantially neutralize the free fatty acids, and said activated carbon being sufficient to cause a substantially stable decolorized fat to be rendered from the tissue but not exceeding about 3% of the weight of the charge.

4. A method of rendering animal fats from tissues which comprises adding a mixture of sodium bicarbonate and activated carbon to a charge of fats to be rendered and maintaining said charge at a rendering temperature out of direct contact with the atmosphere and in the presence of said activated carbon and said sodium bicarbonate for a sufficient time to separate the fat from the tissue, said bicarbonate being added in sufficient quantity to substantially neutralize the free fatty acids, and said activated carbon being sufficient to cause a substantially stable decolorized fat to be rendered from the tissue but not exceeding about 3% of the weight of the charge.

5. A method of rendering animal fats from tissues which comprises adding activated carbon and a mild alkali to a charge of fats to be rendered, the carbon and alkali added being between .05 and 1.0% of the charge by weight and the carbon being in excess of the alkali, and maintaining the charge at a rendering temperature out of direct contact with the atmosphere and in the presence of said carbon and alkali, until the fat is thoroughly rendered.

6. A method of rendering animal fats from tissues which comprises adding a mixture of activated carbon and sodium bicarbonate to a charge of fats to be rendered, said mixture added being between 0.1 and 1.0% of the charge by weight and the carbon being in excess of the bicarbonate, and maintaining the charge in a closed vessel at a rendering temperature in the presence of said mixture for a period of at least 30 minutes.

7. The method of rendering animal fats from tissues which comprises heating raw fats and maintaining the same at a rendering temperature out of direct contact with the atmosphere for a sufficient time to separate the fat from the tissue in the presence of sufficient activated carbon to produce a decolorized, substantially non-odorous, and substantially stable fat, said activated carbon not exceeding about 3% of the weight of the raw fats.

8. A method of rendering animal fats from tissues which comprises adding activated carbon to a charge of fats to be rendered and maintaining said charge in a closed vessel at a rendering temperature and under super-atmospheric pressure in the presence of said activated carbon for a sufficient time to separate the fat from the tissue, said activated carbon being added in sufficient amount, not exceeding about 3% of the weight of the charge, to produce a substantially non-odorous and stable fat.

9. A method of rendering animal fats from tissues which comprises adding .05 to 1.0% of activated carbon to a charge of fats to be rendered and maintaining said charge in a closed vessel at a rendering temperature in the presence of said activated carbon for a sufficient time to separate the fat from the tissue.

10. A method of rendering animal fats from tissues which comprises bringing steam under pressure into direct contact with a charge of fats to be rendered in a closed vessel, in the presence of sufficient activated carbon, not exceeding about 3% of the weight of the charge, and for a sufficient time to separate a substantially stable, decolorized, and non-odorous fat from the tissue.

11. A method of rendering animal fats from tissue which comprises bringing steam under pressure into direct contact with a charge of fats to be rendered in a closed vessel, in the presence of activated carbon and a mild alkali for a sufficient time to separate the fat from the tissue, the carbon being in sufficient quantity, not exceeding about 3% of the weight of the charge, to produce a substantially stable, decolorized and non-odorous fat, and the alkali being sufficient to substantially neutralize the free fatty acids.

12. A method of rendering animal fats from tissue which comprises heating the raw material and maintaining it at a rendering temperature in a closed vessel in the presence of approximately .4% of a highly activated carbon based upon the weight of the raw material for a sufficient time to separate the fat from the tissue.

13. A method of rendering animal fats from tissues which comprises heating raw fats and maintaining the same at a rendering temperature out of direct contact with the atmosphere for a sufficient time to separate the fat from the tissue in the presence of sufficient activated carbon to produce a decolorized, substantially non-odorous and substantially stable fat, said activated carbon not exceeding about 3% of the weight of the raw fats, and subsequently permitting settling and cooling of the rendered charge under a vacuum.

JOHN P. HARRIS.